March 9, 1971  R. W. MORGAN  3,568,276

BODY INCISION CLOSURE

Filed Nov. 19, 1968  4 Sheets-Sheet 1

INVENTOR
ROBERT W. MORGAN

BY Morgan S. Blodgett
ATTORNEY

ROBERT W. MORGAN
INVENTOR

BY
ATTORNEY

March 9, 1971 R. W. MORGAN 3,568,276
BODY INCISION CLOSURE
Filed Nov. 19, 1968 4 Sheets-Sheet 4

INVENTOR
ROBERT W. MORGAN

BY *Norman S. Blodgett*
ATTORNEY

United States Patent Office 3,568,276
Patented Mar. 9, 1971

3,568,276
BODY INCISION CLOSURE
Robert W. Morgan, Worcester, Mass., assignor to Worcester County National Bank, Worcester, Mass.
Filed Nov. 19, 1968, Ser. No. 776,993
Int. Cl. A01n 1/00
U.S. Cl. 27—21        6 Claims

ABSTRACT OF THE DISCLOSURE

This invention relates to a body seal and, more particularly, to apparatus and methods useful during autopsy and embalming procedures for closing body incisions.

BACKGROUND OF THE INVENTION

Since its early inception, the art of science of medicine has worked inseparably with post-mortem examination and studies. By such autopsies, it has successfully evaluated diagnostic accuracy and therapeutic wisdom. It has noted the structural and functional transitions of disease, grossly and microscopically in cell tissues and organs. However, the technique of preparing the cadaver for embalming in the course of the autopsy procedure has not advanced along with the tremendous technological and advances of the medical profession. It might be said that other fields of human endeavor have advanced much more rapidly in enabling modern society to attain its needs and desires rapidly and efficiently. Nevertheless, people have cooperated with the medical profession in its quest for the extension of medical knowledge by sometimes granting physicians authorization to perform post-mortem examination and studies on relatives. However, there is a gradual tendency to decrease the time between death and the viewing hour or funeral. This tendency has been recognized by the funeral profession, so far as un-autopsied bodies is concerned. This does not imply that there should be a reduction of time in the actual evisceration or examination procedure, but it suggests that better methods might be employed during autopsy in preparing the cadaver for subsequent embalming, thus compensating for the time utilized by the autopsy examination. The factors which lead to this desire for a shortened time before the funeral are as follows:

(1) The insurance industry and experience have educated society that the period of bereavement need not be augmented by the worry as to how the funeral is to be paid for. By purchasing an insurance policy in the amount of one's needs, the mortician, at the time of death, is willing to proceed with dispatch in rendering his services and the other contingencies of the funeral. He then waits for the insurance company to reimburse him.

(2) The transportation industry is rapidly creating safe, rapid, and comfortable modes of transportation from one geographical area to another; thus, people enjoy these modern modes of transportation for business or personal ventures and are also using this method to take them rapidly to the place where the funeral is to take place. Therefore, funerals can be performed sooner after death, even when the body must be shipped to a distant point for funeral and burial.

(3) A greater segment of our society is enjoying rising economic prosperity, thereby enabling it to employ increasingly modern techniques in attaining its desires.

Now, several large hospitals embalm their autopsied cadavers free of charge as a means of increasing the doctors' chances of convincing the relatives that an autopsy ought to take place. Although this is an earnest effort rendered by these hospitals in trying to meet the desires of society, nevertheless, the probability is high that the next of kin who signs the autopsy authorization becomes disillusioned. The reason is due to the fact that, whereas the hospital embalmer preserves the cadaver well, usually he cannot pose the features in as life-like a manner as would be true if the subject is treated by the funeral-home embalmer. Usually, the latter has known the decedent during his life, or has met with the immediate relatives to discuss funeral arrangements. He, thus, has a better idea of how to produce a more satisfactory repose. Other undesirable features of the hospital embalming program are as follows:

(1) It is not a realistic solution to present and future needs of the medical profession and to the general desires of human society.

(2) It is not an improvement over the old techniques.

(3) It does not reduce the time before which the viewing hour or the funeral can take place.

(4) There is unnecessary expense for the hospital.

(5) It reduces the economy and employment of the funeral profession on a broad basis and takes away from normal funeral home procedure.

These and other difficulties experienced with the prior art devices and procedures have been obviated in a novel manner by the present invention.

It is, therefore, an outstanding object of the invention to provide a body seal which makes it possible for hospital autopsy rooms to honor modern society's desire for a shorter period before the viewing hour or funeral on autopsied cadavers.

Another object of the present invention is the provision of a body seal which is an economical and modern implement in preparing the cadaver during autopsy procedure for subsequent embalming.

A further object of the present invention is the provision of a body seal which will not impede the physician during autopsy.

It is another object of the instant invention to provide a method for performing an autopsy which will create a more tranquil relationship between hospitals, society, and the funeral profession, thus bringing about an increase in postmortem study and examination authorization by doctors.

Another object of the invention is to provide a method of autopsy and embalming which will speed up the procedures, so that the advantages of early funeral services can be realized.

A further object of the invention is the provision of a body seal which will remove the difficulty, particularly with regard to autopsied bodies, of the necessity for sewing the body incision twice, i.e., once following the autopsy and once following the embalming procedure.

A still further object of the invention is to provide a body seal that will obviate the possibility of infection due to the pricking of one's finger during sewing procedures following autopsy and embalming.

It is a still further object of the invention to provide a scalpel guide which will permit the incision of a body in the track of a slide fastener without the possibility of the scalper cutting the material of the fastener.

Another object of the invention is the provision of an arterial connecter which is useful in embalming a body where autopsy has taken place.

A further object of the invention is the provision of a kit which can be used for closing an autopsy incision prior to the transportation of the cadaver to a funeral home for embalming.

It is a further object of the invention to provide a body seal which obviates the difficult and disagreeable task of sewing a body cavity after autopsy or embalming procedures.

With these and other objects in view, as will be apparent to those skilled in the art, the invention resides in the combination of parts set forth in the specification and covered by the claims appended hereto.

SUMMARY OF THE INVENTION

In general, the present invention relates to a body seal having a closure element with a first and a second portion adapted to lie on opposite sides of an incision, having an adhesive means formed on the first and second portions to cause them to adhere to the skin on either side of the incision, and having means for locking the said first and second portions together in fluid-tight relationship. More specifically, the closure element is generally Y-shaped to correspond to an autopsy incision and the closure element is formed from a single sheet of plastic which is separated into the first and second portions by a Y-shaped cut. The Y-shaped cut is produced by the same stroke of the scalpel as produces the autopsy incision. The adhesive means consists of a layer of pressure-sensitive and waterproof material which is covered with a protecting sheet that is peeled off before use. The means for locking is a plastic slide fastener and matching apertures are provided along adjacent edges of the first and second portions. Wire staples are provided to extend between the apertures to hold the edges together and relieve the slide fastener of transverse tension.

In addition, the invention has to do with a method of performing an autopsy consisting of the steps of applying to the cadaver a closure element having the general form of the autopsy incision and having adhesive on the surface contacting the cadaver, of performing simultaneously an incision through the closure element and the cadaver into the body cavity, and then joining the adjacent edges of the closure element formed by the incision by the use of a fluid-tight means. The incision is made by the use of a scalpel guide having the form of a shoe with an elongated pointed conformation, having a flat bottom and having a slot extending through it in the direction at a right angle to the surface. The guide is formed of metal and the slot terminates in a narrow longitudinal groove formed on the bottom. This shoe slides in the track of the slide fastener and prevents the scalpel from cutting the plastic slide fastener. In addition, an artery connector is provided which consists of a main junction box adapted to lie in the body cavity of a cadaver and having a plurality of flexible tubes extending from the box and adapted to be connected to severed arteries which enter the cavity. A flexible tube extends from the center of the box for the introduction of embalming fluid and the interior of the end of each tube which is opposite the end which is attached to the box is provided with piercing elements. It is contemplated that the equipment would be provided to the pathological laboratory of a hospital in the form of an autopsy kit having a viscera pouch formed of a waterproof material and having a liquid-tight closure, having a body seal in the pouch, the seal being formed of flexible sheet having adhesive means on one surface covered by a protective sheet and having a slidable fastener on the other surface, and having possibly a pressure-sensitive patch and a plurality of tension-relieving staples for use with the body seal.

BRIEF DESCRIPTION OF THE DRAWINGS

The character of the invention, however, may be best understood by reference to one of its structural forms, as illustrated by the accompanying drawings, in which.

Figure 1:
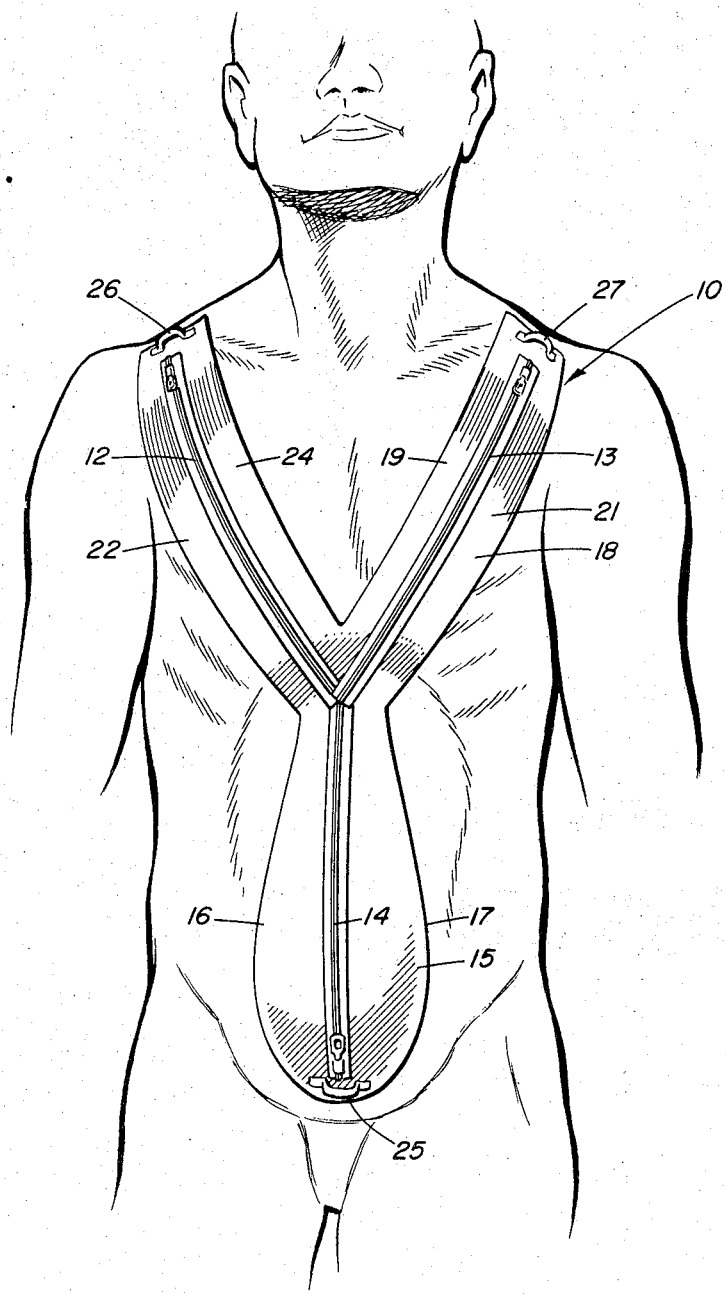
FIG. 1 is a perspective view of a body seal embodying the principles of the present invention shown in use with a cadaver.

Referring first to FIG. 1, wherein are best shown the general features of the invention, the body seal, indicated generally by the reference numeral 10, is shown in use on the chest and pelvic region of a cadaver 11. The body seal is Y-shaped and is provided with three slidable fasteners 12, 13, and 14 which meet at the junction of the Y. The lower leg 15 of the seal is divided into a first portion 16 and a second portion 17 by the slidable fastener 14. Similarly, the upper arm 18 is divided by the slidable fastener 13 into a first portion 19 and a second portion 21. The other upper arm 22 is divided by the slidable fastener 12 into a first portion 23 and a second portion 24. At the lower extremity of the leg 15 in line with the fastener 14 is a gripping loop 25, while similar loops 26 and 27 are located at the upper ends of the arms 22 and 18, respectively.

Figure 2:
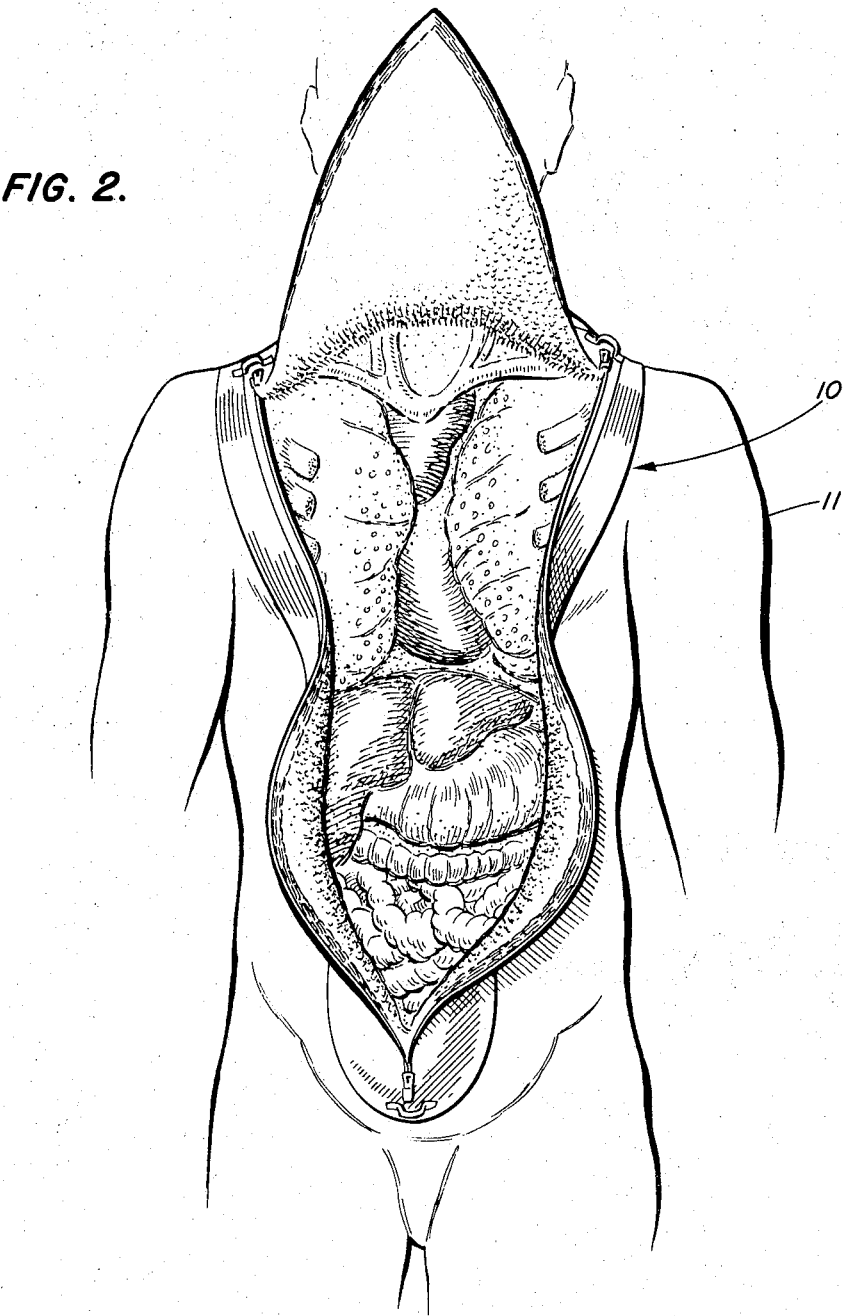
FIG. 2 shows the condition of the body seal in a cadaver during autopsy procedures.

FIG. 2 shows the condition of the cadaver 11 when an incision has been made in the path of the fasteners 12, 13, and 14 in a Y-shape, the fastener slides being located at the extreme ends of their tracks. In this view, it can be seen that the body covering on either side of the incision has been drawn back and the chest section or flap between the arms of the Y has been laid back over the face of the cadaver.

Figure 3:
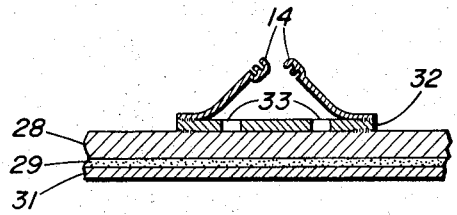
FIGS. 3, 4, 5, and 6 show a cross-section of the body seal taken during various stages of the autopsy procedures.

FIG. 3 shows a section through the leg 15 of the body seal 10 before it is used. The main body 28 is formed of plastic sheet and has applied to its undersurface an adhesive means such as a pressure-sensitive adhesive layer 29. A thin sheet 31 of paper is laid over it and can be peeled away before use of the body seal. Located on the upper surface of the main body 28 is a plastic strip 32 which is heat-sealed to the main body 28 at the outer edges only. Located along the strips are apertures 33 located in pairs along the length of the strip. Finally, on the upper surface of the strip 32 is located a plastic slide fastener 34 which is provided with two halves in the usual way which are brought into locking relationship by the slide extending down the track.

In order to use the body seal during an autopsy, the body is laid with its back down on the autopsy table, and the skin of the chest and abdomen is dried as thoroughly as possible, perhaps by the use of a volatile substance, such as alcohol or ether. A sheet 31 is removed from the underside of the body seal 10, so that the adhesive layer 29 is exposed. The body seal is laid on the body in the manner shown in FIG. 1 and pressed firmly into place. The slide fastener slides are moved to the outer ends of their tracks and an incision is made by use of a scalpel.

Figure 4:
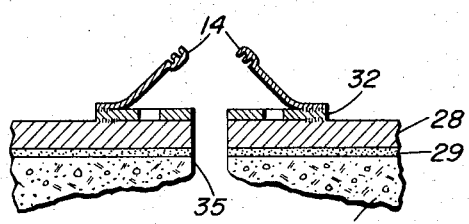
Figure 5:
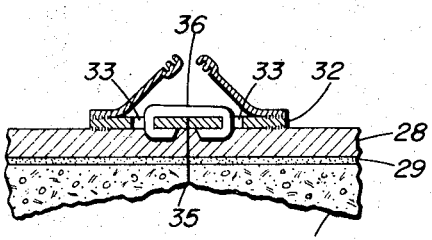

Referring to FIG. 4, the incision 35 is made in a Y-shaped form between the two halves of the slide fastener 14. The incision is made not only through the skin, bone, cartilage and the like constituting the outer covering over the body cavity of the cadaver, but the incision is also made through the strip 32, through the main body 28 of the body seal, and, of course, through the adhesive layer 29. The incision can be performed more readily by the use of a scalpel guide, as will be described more fully hereinafter.

After the autopsy procedures have been carried out and the viscera examined and tests performed, it is necessary to reclose the incision. The body, particularly in the abdomen area, is squeezed by use of the hands or a large belt, so that the sides of the incision 35 come together. This brings together the cut edges of the main body 28 and the strip 32 forming parts of the body seal. Then, a staple 36 is inserted into a pair of the matching apertures 33 is is bent over on the underside of the strip 32 by the use of pliers or a special crimping tool. This serves to hold the two halves of the body seal together, so that a minimum of transverse tension appears across the slide fastener 14, which slide fasteners are notoriously poor in resisting separating forces transversely their length.

Figure 6:
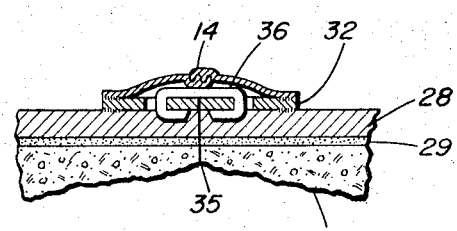

Finally, as shown in FIG. 6, the slide is passed along the slide fastener 14, so that the slide fastener is closed in fluid-tight relationship. When this has been entirely performed, all of the slides of the slide fasteners 12, 13, and 14 reside in the intersection of the arms and leg of the Y-shaped seal, so that the body incision is now in closed fluid-tight condition, so that the cadaver can be transported to the undertaker for embalming.

In the embalming room, after the body is placed on the preparation table, the embalmer is ready to commence arterial injection, so he opens the body cavity by slowly moving the slide fastener sliders to the ends of the shoulder and pelvic region. The flaps of the body are reflexed carefully. If the viscera is in the cavity, it probably would be located in a viscera pouch, which will be described more fully hereinafter. This pouch is removed by pulling it out at the pelvic region and laid aside temporarily. Arterial injection is commenced in the usual way and the viscera pouch is sanitized and eventually closed. After the arterial embalming is completed and, if the viscera is available and in the pouch, the pouch is re-folded and replaced in the body cavity. It is slid under the rib cage (so as to avoid snagging on rib edges) to a desired position and the viscera are manipulated in the pouch to obtain normal body contours. It should be noted that, if the viscera is not returned with the body, and the embalmer uses a hardening compound or granular preservative to fill in the body cavities and to preserve the flaps, it is necessary to prevent these materials from being deposited on the slide fastener track. The embalmer will, in order to do this, place a strip of hand towel papers over the compounds where the chest and abdominal flaps will meet. The embalmer carefully brings the chest and abdominal flaps into proper position for closing. He places a detention strap under the back with the Velcroe surface facing the preparation table. The strap is brought across the abdomen where it will be approximately four inches below the zippered junction and the ends of the strap are brought thru ring until the tension has been relieved, so that the zipper tracks are close together. Then, the staples are inserted in the holes in the way that has been described in connection with the autopsy procedure and tightened up. Then, the abdomen is closed first by starting the slider in the pelvic region while holding back on the loop 25. This is repeated, so far as the other two slide fasteners 12 and 13 are concerned. Presumably, the embalmer may wish to use a patch in the junction of the three slides to make sure that it is fluid-tight.

FIGS. 7 through 14 show the details of a scalpel guide 34. As is obvious in FIG. 7, the device in generally shoe-shaped and is elongated. It is provided with a rounded point 37 at one end. It has a flat bottom 38 and, extending entirely through it from top to bottom, is a slot 39 somewhat larger than the width of a scalpel 41. The slot terminates in a narrow groove 42 extending lengthwise of the bottom 38. As is best evident in FIG. 9, the main part of the guide is trapezoidal in cross-section and has inclined sides 43 and 44 along which the track of the slide fastener can slide. The forward end is pointed and rounded suitably to act as a plow for pushing and sliding along the track. In operation, the guide is inserted in the track of the slide fastener and then the scalpel is inserted through the slot 39, through the body seal 10, and through the skin and so on of the cadaver. When the scalpel is moved along its usual autopsy path, the guide acts to keep the scalpel located exactly centrally of the slide fastener and exactly half-way between the apertures 33 in the strip 32. There is, therefore, no danger of the scalpel cutting into the sides of the fastener and making it less than fluid-tight when the fastener has been closed. Any cutting of the track of the slide fastener would make it difficult to move the slider along it and close the fastener when the time came to perform that function.

Figure 15:
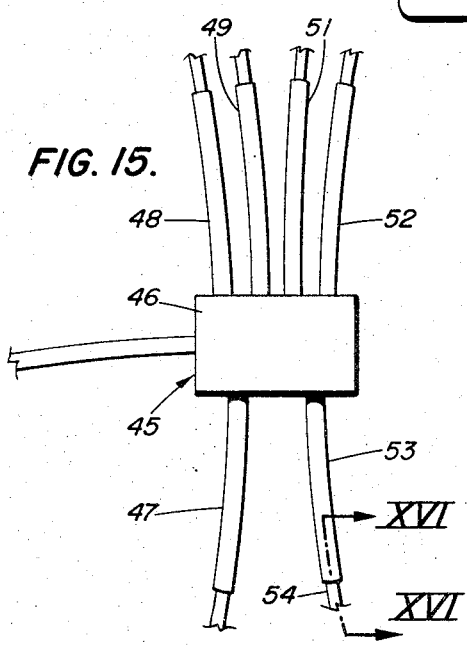
FIG. 15 is a perspective view of an artery connector used during the inventive autopsy procedures.
Figure 16:
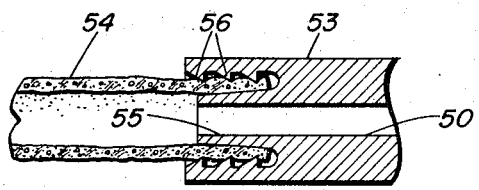
FIG. 16 is a sectional view of the connector taken on the line XVI—XVI of FIG. 15.

In FIGS. 15 and 16 is shown an apparatus which would be useful to the embalmer during the embalming part of the procedure. With the body in the condition shown in FIG. 2, the embalmer inserts the artery connector 45 with its main junction box 46 in the body cavity. There are six flexible tubes 47, 48, 49, 51, 52, and 53 extending outwardly of the junction box. The two tubes 47 and 53 are intended for the leg femoral arteries and extend downwardly toward the bottom of the body cavity for attachment to those two particular arteries. The other four tubes extend upwardly into the main four arteries of the upper body for attachment thereto. Normally, after the autopsy, these arteries have been severed and the ends only extend into the body cavity. The embalmer may have some trouble grasping these arteries for the injection of the embalming fluid, so that, the most desirable situation would be for the person performing the autopsy to attach the artery connector at the time of the autopsy before these arteries disappear into their respective portions of the body and are hard to grasp.

As is evident in FIG. 16, the tube 53 is attached to the femoral artery 54. The outer end of the tube 53 is provided with a central bore 50 surrounded by a conical plug 55 which fits into the interior bore of the artery 54. Surrounding the plug, concentric with it, and spaced from it is an axial flange 60 which slides over the outer surface of the artery 54. Finally, extending inwardly from the inner surface of the flange 60 are sharp piercing members 56 which extend into the flesh of the artery 54 and act as barbs to prevent the removal of the artery or the sliding out of the artery from the tube 53. This takes care of the fact that arteries vary in size over an extreme range, depending on the age, size, weight, and so forth of the cadaver. Finally, extending from the center of the junction box 46 is an injection tube 57 which may be used by the embalmer for the injection of the embalming fluid.

Figure 17:
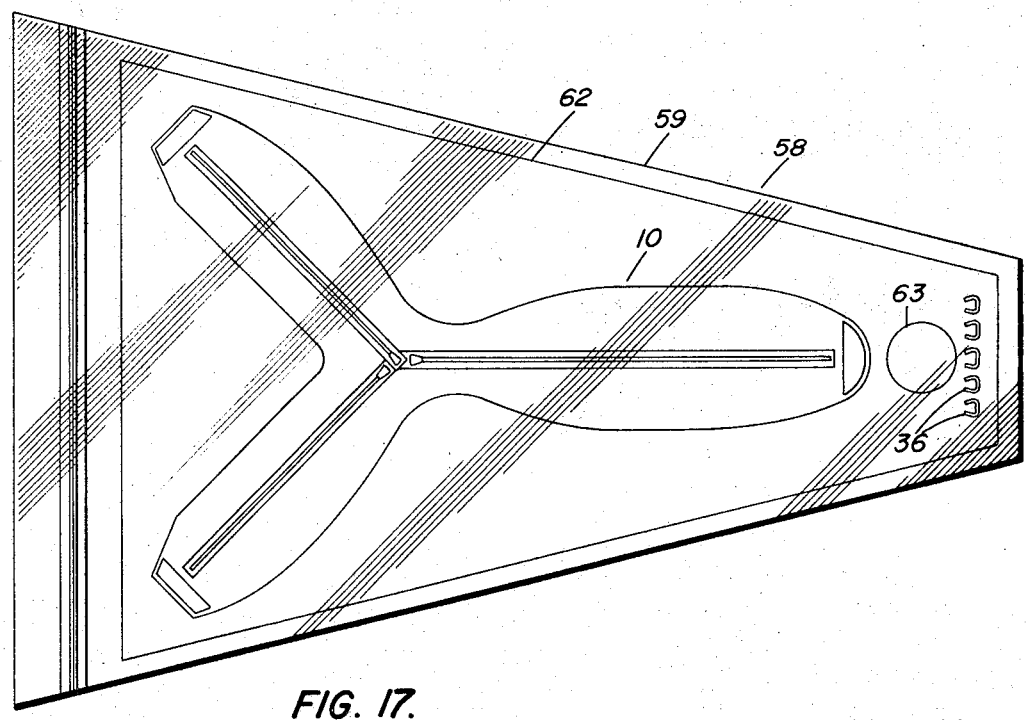
FIG. 17 is a perspective view of an autopsy kit.
Figure 7:
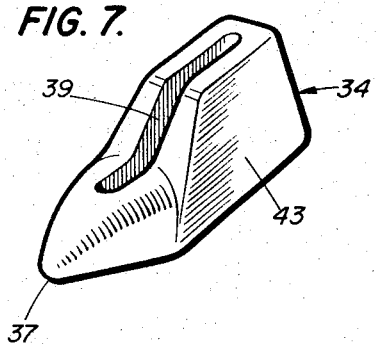
FIG. 7 is a perspective view of a scalpel guide used with the invention.
Figure 8:
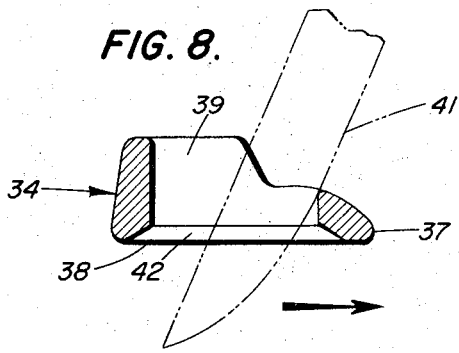
FIG. 8 is a vertical sectional view of the guide.
Figure 13:
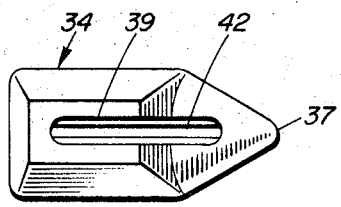
FIG. 13 is a plan view of the guide.
Figure 11:
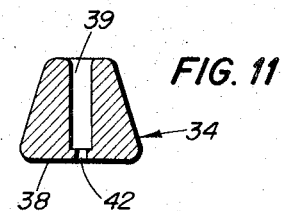
FIG. 11 is a vertical sectional view of the guide taken on the line XI—XI of FIG. 10.
Figure 9:
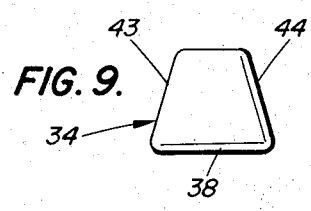
FIG. 9 is an end view of the guide.
Figure 10:
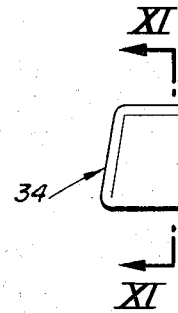
FIG. 10 is a side view of the guide.
Figure 12:
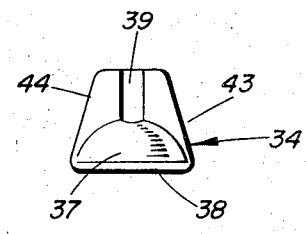
FIG. 12 is another end view of the guide.
Figure 14:
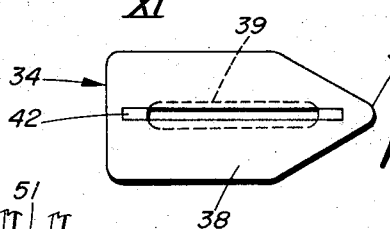
FIG. 14 is a bottom view of the guide.

Referring now to FIG. 17, there is shown therein a package, such as an autopsy kit 58 consisting, first of all, of a viscera pouch 59 formed of a material such as a clear vinyl plastic having a generally trapezoidal shape with a fluid-tight locking closure 61 located across the upper wide end. The closure 61 is of the well-known type consisting of two strips of plastic having locking tracks which can be pressed together to lock them in fluid-tight, air-tight relationship. Nevertheless, they are easily opened by the use of the fingernail. Inside the pouch is a strip of heavy cardboard 62 having somewhat the same shape as the pouch 58 but being smaller in size to fit inside of it and carrying on its surface a body seal 10. Also located in the viscera pouch is at least one round patch 63 having pressure-sensitive adhesive on one side covered by a protective sheet which can be peeled off to expose the plastic. This patch is used in the manner suggested above at the junction of the three slide fasteners 12, 13, and 14 to assure a fluid-tight closure. Also located in the pouch 58 is a series of the staples 36.

As has been described above, the autopsy procedure will normally result in a certain amount of loose viscera which may either be disposed of in the hospital or may be placed in the pouch 58 and inserted in the body cavity before the cadaver 11 is transported to the embalming room. The viscera pouch is opened by the embalmer by opening the fastener 61 for its entire length. He then pours in the desired amount of preservative for viscera fixation. He should use a stiff toothbrush to clean the fastener tracks, and then the pouch is closed by pressing the closure 61 together tightly up to about one inch from the end of the fastener. Then, all of the air that may have collected in the pouch is squeezed out of that one inch opening. Then the opening is closed tightly in the usual way. When the viscera pouch is closed in this way properly, it is air- and moisture-proof. When the embalmer is finished with his work, he should fold up the viscera pouch and re-insert it in the body cavity to provide the proper body contours desirable in correct embalming technique.

It can be seen, then, that by use of the techniques and apparatus described above, it is possible, first of all, to end the age-old conflict between the pathological laboratory and the undertaker. The undertaker has always been hesitant in the past to recommend to families that autopsies be performed because he has found that, when the autopsy has been performed on the cadaver, this means an extraordinarily large amount of extra work for him to perform. With the use of the present apparatus, the embalmer should not only find his work no harder, but he should actually encourage the autopsying of cadavers and the subsequent increase in medical knowledge due to more frequent investigation of actual cause of death. Furthermore, the pathological laboratory will have the advantage that the long-time consuming work of re-sewing the cadaver is obviated, which results not only in a saving of time, but makes it possible to obtain pathological laboratory assistants more readily, since the sewing of the body (normally performed by the pathological assistant) is a difficult and disagreeable piece of work and there are very few people who wish to perform it.

It should be noted, also, that the use of the body seal of the present invention permits the embalmer very readily to have access to the body cavity, so that, after the incision has been closed, if he is not satisfied with the body contours, it is very easy for him to re-open the body cavity and make the necessary insertions of material or removal thereof. More fundamentally, however, the use of the present invention should result in a large increase in medical knowledge, due to the more frequent use of autopsy and post-mortem examinations. The autopsy will be encouraged not only by the doctor, but also by the funeral director. Furthermore, the other objection to autopsies, that it increases the time between death and the calling hours or funeral rituals, is done away with, since the only thing that has held up the procedure in the past has been the long time required for the sewing and re-sewing of the incision.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A body seal, comprising:
   (a) a closure element of one piece construction having a first and a second portion adapted to be separated by a Y-shaped cut and to lie on opposite sides of an autopsy incision, said closure element being generally Y-shaped to correspond to said autopsy incision,
   (b) an adhesive means formed on the first and second portions to cause them to adhere to the skin on either side of said incision,
   (c) means for locking the said first and second positions together in fluid-tight relationship after they are separated by said cut,
   (d) matching apertures provided along adjacent edges of the first and second portion, and
   (e) wire staples provided to extend between the apertures to hold the edges together and relieve the locking means of transverse tension.

2. A body seal as recited in claim 1, wherein the closure element is formed from a single sheet of plastic.

3. A body seal as recited in claim 1, wherein the adhesive means is a layer of pressure-sensitive and waterproof material.

4. A body seal as recited in claim 3, wherein the adhesive is covered with a protecting sheet that is peeled off before use.

5. A body seal as recited in claim 1, wherein the means for locking is a plastic slide fastener.

6. A body seal, comprising:
   (a) a closure element having a first and a second portion adapted to lie on opposite sides of an incision, closure element being generally Y-shaped to correspond to an autopsy incision, being formed from a single sheet of plastic and adapted to be separated into the first and second portions by a Y-shaped cut,
   (b) an adhesive means formed on the first and second portions to cause them to adhere to the skin on either side of the incision, and
   (c) means for locking the said first and second positions together in fluid-tight relationship subsequent to the formation of said cut.

References Cited
UNITED STATES PATENTS

| | | | |
|---|---|---|---|
| 2,409,489 | 10/1946 | Hurt | 150—3 |
| 2,567,298 | 9/1951 | Morner | 24—203 |
| 2,752,921 | 7/1956 | Fink | 128—334 |
| 3,516,409 | 6/1970 | Howell | 128—335 |

RICHARD A. GAUDET, Primary Examiner

G. F. DUNNE, Assistant Examiner

U.S. Cl. X.R.

24—205.1; 128—335